E. EPSTEIN.
COASTER BRAKE.
APPLICATION FILED SEPT. 26, 1910.
988,323.
Patented Apr. 4, 1911.
2 SHEETS—SHEET 1.
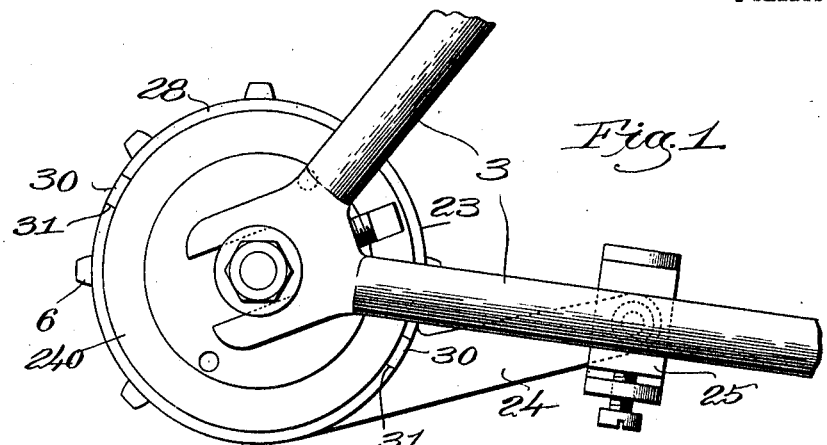
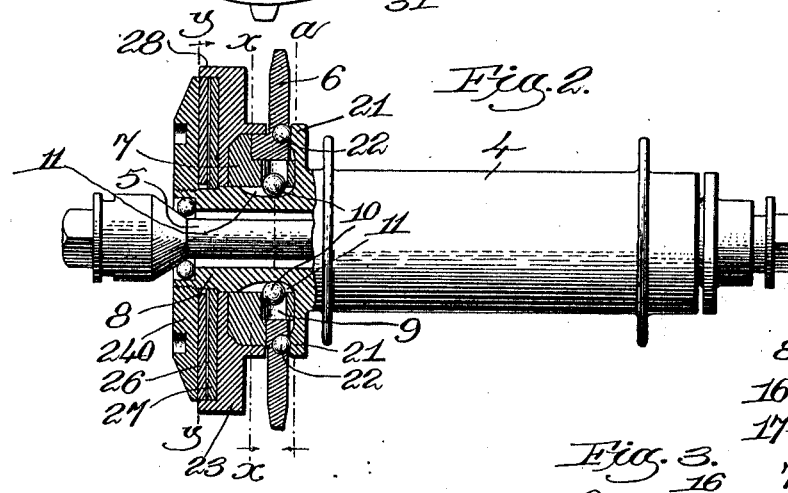

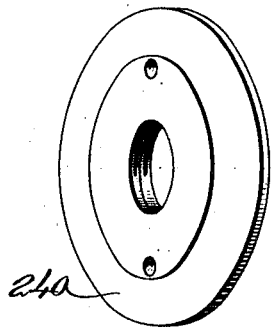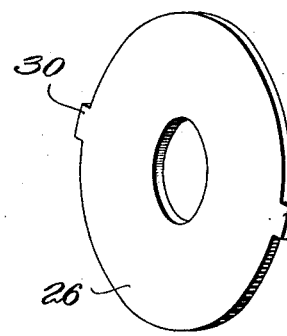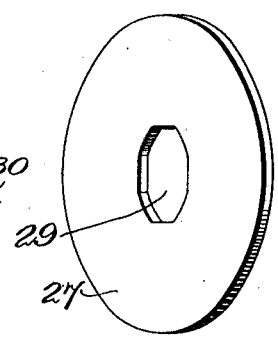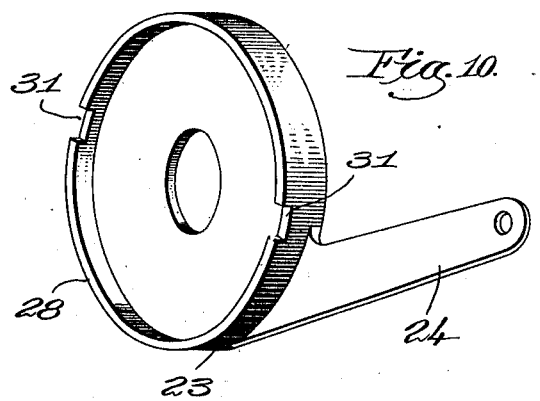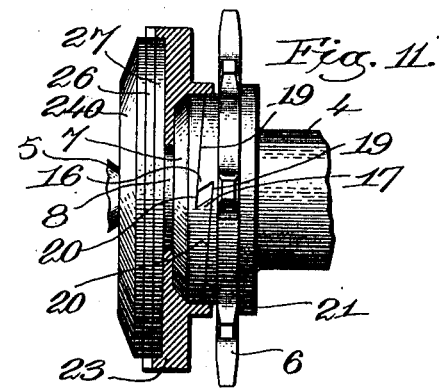

UNITED STATES PATENT OFFICE.

ELI EPSTEIN, OF BOSTON, MASSACHUSETTS.

COASTER-BRAKE.

988,323.  Specification of Letters Patent.  Patented Apr. 4, 1911.

Application filed September 26, 1910. Serial No. 583,753.

*To all whom it may concern:*

Be it known that I, ELI EPSTEIN, a subject of the Czar of Russia, and resident of Boston, county of Suffolk, State of Massachusetts, have invented an Improvement in Coaster-Brakes, of which the following description, in connection with the accompanying drawing, is a specification, like characters on the drawing representing like parts.

This invention relates to coaster brakes for bicycles and has for its object to provide a device of this character which is simple and composed of relatively few parts and which can be easily kept in repair and which is so constructed that the bicycle may be rolled backwardly without causing the brake to be applied.

The features wherein my invention resides will be more fully hereinafter described and then pointed out in the appended claims.

In the drawings, Figure 1 is a side view of a bicycle hub embodying my invention; Fig. 2 is an elevation of the hub showing the brake and driving mechanism in section; Fig. 3 is a section on the line $x$—$x$, Fig. 2; Fig. 4 is a view of the sprocket wheel and the brake-actuating and driving member; Fig. 5 is a section on the line $y$—$y$, Fig. 2; Fig. 6 is a section on the line $a$—$a$, Fig. 2, with the sprocket wheel omitted. Figs. 7, 8 and 9 are perspective views of the brake-disks; Fig. 10 is a perspective view of the brake member; Fig. 11 is a view partly in section showing the parts in position for applying the brake; Fig. 12 is a perspective view of the combined driving and brake-actuating member; Fig. 13 is a perspective view of the sprocket wheel.

I have shown at 3 part of the frame of the bicycle and 4 designates the bicycle hub which is mounted on the spindle or axle 5 in usual manner.

6 is the sprocket wheel by which the bicycle is driven forwardly. The sprocket wheel has associated therewith the combined driving and brake-actuating member 7 which is loosely mounted on the portion 8 of the hub and means are provided whereby when the sprocket wheel is rotated forwardly, it will be clutched to this combined driving and brake-actuating member, and the latter will be clutched to the portion 8 of the hub thereby driving the wheel forwardly, while when the sprocket wheel is turned backwardly it will act on the combined driving and brake-actuating member 7 to cause the brake to be applied. This member 7 is provided with a plurality of pockets 9 adapted to receive clutch balls 10, and the portion 8 of the hub is provided with recesses 11 in which said balls are partially received. Each recess 11 is formed with the abrupt shoulder 12 and the tapering surface 13 and the pockets 9 are inclined relative to a radial line, as seen in Fig. 3, so that when the driving member is moved forwardly or clockwise in said figure, the balls 10 will be gripped between the walls 14 of the pockets 9 and the abrupt shoulders 12 of the recesses 11 so that the turning movement of the driving member will be communicated to the hub. The portion of the combined driving and brake actuating member in which the pockets 9 are formed is encircled by the hub of the sprocket wheel 6, and said sprocket wheel is provided with the shoulders 16 which are adapted to engage corresponding shoulders 17 formed on the member 7, said shoulders being so arranged that during the forward rotation of the sprocket wheel the shoulders will be in engagement and the member 7 will be thereby rotated forwardly. The hub 8, however, can rotate forwardly relative to the combined driving and brake-actuating member 7 by reason of the fact that the inclined surfaces 13 of the recesses will merely cam the balls 10 outwardly into the pockets 9, thus allowing the balls to click over the portions 18 on the hub 8 between the recesses. When, therefore, the bicycle rider holds the sprocket wheel stationary, the hub 4 of the rear wheel can turn freely, thus permitting the rider to coast.

The brake is applied by moving the member 7 longitudinally of the hub, and this is accomplished by giving the sprocket wheel a slight backward turn. To accomplish this the sprocket wheel is provided with the inclined cam faces 19 which engage similar cam faces 20 formed on the side of the member 7 so that when the sprocket wheel is turned backwardly relative to said member, said member will be moved longitudinally of the hub. The sprocket wheel is prevented from longitudinal movement by its engagement with a flange 21 formed on the hub, and I will preferably provide a ball bearing 22 between the sprocket wheel and flange to resist friction. The member 7 is received in a recess formed in a stationary brake member 23, said member being shown as having an arm 24 thereon, the end of which is adapted to be secured to the frame 3, as at 25. This stationary member surrounds the portion 8 of the hub, and the hub is arranged to rotate freely therein. Said hub is provided with a brake-disk 240 which rotates therewith and which is adapted to have frictional engagement either with the brake member 23 or with intermediate brake-disks, as desired. In the present embodiment of my invention I have shown intermediate brake-disks situated between the brake member 23 and the brake-disk 240, such intermediate disks being shown at 26 and 27, respectively, and the disk 26 being stationary, while the disk 27 is secured to the hub to rotate therewith.

The longitudinal movement of the member 7 due to the backward turning movement of the sprocket wheel serves to force the brake member and the brake-disks hard into frictional contact with each other and thereby applies a braking action to the wheel. The brake-disk 26 may be held stationary in any suitable way. I have herein shown the brake member 23 as provided with the peripheral flange 28 which embraces the disks 26 and 27, and this flange is provided with one or more notches 31 which receive a finger or fingers 30 formed on the brake-disk 26. The brake-disk 27 may be secured to the hub to rotate therewith in any approved way, and I have shown it as provided with the flat-sided aperture 29 which fits a correspondingly-shaped portion on the part 8 of the hub. The brake-disk 240 is shown as screw-threaded to the part 8 of the hub, although it might be fastened thereto in any suitable way.

It will be noted that in my invention the sprocket wheel is mounted on and supported by the combined driving and brake-actuating member and that the power is transmitted from the sprocket wheel to the bicycle hub through said member. The advantage of this construction is that the bicycle can be rolled backwardly without causing the brake to be set because when the wheel is turned backwardly the combined driving and brake-actuating member 4 will be turned backwardly with the wheel and the sprocket wheel will move with it. This backward rotation, however, does not cause any relative movement between the sprocket wheel and the combined driving and brake-actuating member so that the brake will not be set. This is a decided advantage as it facilitates the trundling of the wheel around.

It will be seen from the above that my invention comprises comparatively few parts and is, therefore, inexpensive to manufacture, and is so constructed that it can be quickly assembled or taken apart.

Having fully described my invention, what I claim as new and desire to secure by Letters Patent is:—

1. In a coaster brake, the combination with a wheel hub, of a combined driving and brake actuating member thereon, means to clutch said member to the hub when the member is rotated forwardly while permitting the hub to rotate forwardly independently from said member, a brake, and means to apply the brake by a movement of said member longitudinally of the hub, a sprocket wheel separate from and mounted on said member for movement relative thereto, and means to rotate said member forwardly by a forward movement of the sprocket wheel and to move said member longitudinally by a backward movement of the sprocket wheel.

2. In a coaster brake, the combination with a wheel hub, of a combined driving and brake actuating member thereon, a sprocket wheel capable of turning movement relative to said member, means to rotate said member forwardly by a forward rotation of the sprocket wheel and to move said member longitudinally of the hub by a backward rotation of the sprocket wheel, means to clutch said member to the hub when it rotates forwardly, and a brake rendered operative by the longitudinal movement of said member.

3. In a coaster brake, the combination with a wheel hub, of a combined driving and brake-actuating member thereon, means to clutch said member to the hub when it rotates forwardly, a sprocket wheel rotatably mounted on said member, connections between said sprocket wheel and member to cause the latter to be rotated forwardly by a forward rotation of the sprocket wheel, a brake actuated by movement of said member longitudinally of the hub, and cam faces on said member and sprocket wheel whereby a backward rotation of the sprocket wheel will move said member longitudinally and apply the brake.

4. In a coaster brake, the combination with a wheel hub, of a combined driving and brake-actuating member thereon, a ball clutch between said member and hub, a sprocket wheel rotatably mounted on said member, said member and sprocket wheel being provided with means to cause said member to be rotated forwardly by a forward rotation of the sprocket wheel and also with means to cause said member to be moved longitudinally of the hub by a backward rotation of the sprocket wheel, and two brake-disks, one of which is fast to the hub and the other of which is stationary, arranged to be brought into frictional engagement by the longitudinal movement of said member.

5. In a coaster brake, the combination with a wheel hub, of a sprocket wheel, a combined driving and brake-actuating member interposed between the sprocket wheel and the hub, means connecting said sprocket wheel and member whereby forward rotation of the sprocket wheel will rotate the member forwardly and backward rotation of the sprocket wheel relative to said member will move the latter longitudinally, means connecting said member and hub by which the forward rotation of said member is transmitted to the hub while the hub is permitted to rotate forwardly independently of said member, and a brake operated by the longitudinal movement of said member.

In testimony whereof, I have signed my name to this specification, in the presence of two subscribing witnesses.

ELI EPSTEIN.

Witnesses:
LOUIS C. SMITH,
THOMAS J. DRUMMOND.

Copies of this patent may be obtained for five cents each, by addressing the "Commissioner of Patents, Washington, D. C."